United States Patent Office  3,388,179
Patented June 11, 1968

3,388,179
ORGANOMAGNESIUM ADDITION COMPOUNDS, PROCESS THEREFOR, AND DERIVATIVES THEREOF
Hugh E. Ramsden, Scotch Plains, N.J., assignor to Esso Research and Engineering Company, a corporation of Delaware
No Drawing. Continuation-in-part of application Ser. No. 423,293, Jan. 4, 1965. This application Mar. 22, 1967, Ser. No. 625,023
24 Claims. (Cl. 260—665)

ABSTRACT OF THE DISCLOSURE

Organomagnesium compounds formed by the reaction of magnesium with aliphatic conjugated dienes are useful as new Grignard reagents, particularly for the preparation of terpene type compounds useful as odor chemicals and organotin compounds useful as pesticides.

---

This application is a continuation-in-part of copending application Ser. No. 432,293, filed Jan. 4, 1965, now abandoned.

This invention relates to particular organomagnesium compounds, processes for preparing the organomagnesium compounds, and derivatives of these compounds. More particularly, this invention relates to the preparation of novel compounds formed by the reaction of conjugated dienes with magnesium and the novel compounds that can be prepared with the new organomagnesium compounds. In a preferred embodiment of this invention the organomagnesium compounds are converted to novel terpene type compounds including terpene alcohols which are quite useful as odor chemicals in the perfume industry.

Organomagnesium halides have long been known and used as conventional Grignard reagents. However, it is a generally accepted fact that normal Grignard reagents are suitable for use in laboratory preparations of organometallic compounds and their derivatives but are regarded as too expensive for use in commercial operations. Thus, the process of this invention provides a relatively inexpensive procedure for preparing Grignard reagents and further provides a procedure for preparing difunctional Grignard reagents. Since the presently described process does not require alkyl halides but simply aliphatic dienes, both valences of the magnesium are taken up with a hydrocarbon whereas in ordinary Grignard reagents only one valence is satisfied by the hydrocarbon; thus, the utility of the magnesium is increased by a factor of two.

It has been proposed to prepare halogen-free organomagnesium compounds by the reaction of magnesium metal or magnesium hydride with a number of hydrocarbon materials. For example, Barber U.S. Patent 2,788,377, issued Apr. 9, 1957, and 2,933,537, issued Apr. 19, 1960, disclose the preparation of bis(cyclopentadienyl) magnesium or mixtures of bis(cyclopentadienyl) magnesium, bis(methyl-, or lower alkylcyclopentadienyl) magnesium by direct reaction of cyclopentadiene or methylcyclopentadiene with metallic magnesium at temperatures of at least 450° C. and ranging up as high as 1000° C. This reaction occurs because of the highly acidic character of the hydrogens of cyclopentadiene. The equation for this reaction is as follows:

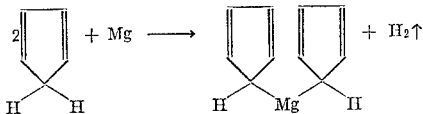

U.S. Patent No. 2,959,625, issued Nov. 8, 1960 to Blitzer et al. and U.S. Patent No. 2,985,692, issued May 23, 1961 to Podall disclose the preparation of alkyl magnesium compounds by reacting an olefin hydrocarbon with magnesium hydride in a reaction medium and in the presence of a catalyst. The equation for this reaction using ethylene as the olefin hydrocarbon is as follows:

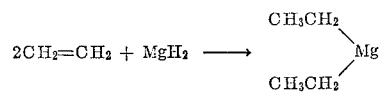

In accordance with this invention, however, halogen free organomagnesium compounds can be prepared by reacting metallic magnesium with $C_4$–$C_{40}$ conjugated diolefins, preferably acyclic conjugated diolefins, including substituted diolefins where the substituents can be cyclic or acyclic. Generally, the conjugated diolefins applicable to this invention may be characterized by the following generic formula:

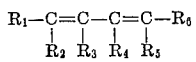

wherein $R_1$, $R_2$, $R_3$, $R_4$, $R_5$ and $R_6$ may be the same or different and are selected from the group consisting of hydrogen and hydrocarbyl radicals, i.e., alkyl, alkenyl, cycloalkyl, cycloalkenyl, aryl, aralkyl, alkadienyl, etc., radicals. It is preferred, however, that $R_1$ or $R_2$ be hydrogen and $R_5$ or $R_6$ be hydrogen so that the carbon atom attached to a double bond is not completely substituted.

While the process is generally applicable to $C_4$–$C_{40}$ diolefins, $C_4$–$C_{10}$ diolefins are preferred. Typical examples of the conjugated diolefins that may be used are: butadiene, 2,3-dimethyl butadiene, 2-phenyl-butadiene, isoprene, 1,4-diphenyl butadiene, myrcene, α-phellandrene, and the like.

As has been previously mentioned, both valences of the magnesium are satisfied by hydrocarbon radicals in this invention. However, there is no necessity that these hydrocarbon radicals be the same. For example, magnesium may be reacted with butadiene and isoprene whereby a butadiene isoprene-magnesium compound can be formed. Other examples of these mixed diolefin compounds are: butadiene hexadiene-magnesium, isoprene alloocimene - magnesium, isoprene 1,1,4,4 - tetramethyl butadiene-magnesium, isoprene piperylene-magnesium, and the like. Consequently, the conjugated olefinic reactant may be referred to as being selected from the group consisting of $C_4$–$C_{40}$ conjugated diolefins and mixtures thereof, preferably $C_4$–$C_{10}$ conjugated diolefins and mixtures thereof.

The reaction of the conjugated diolefins with magnesium can be accelerated by agitating the reaction mixture or by reducing the size of the metallic magnesium particles, i.e., using turnings, pellets, granules, or even powdered magnesium. The magnesium is preferably activated by treatment with a small amount, i.e., a few drops to 2–3 cc. per mole of magnesium, of a $C_1$–$C_{10}$ alkyl halide or sulfate, preferably halides, more preferably lower alkyl halides, e.g., methyl iodide, methyl bromide, methyl chloride, ethyl bromide, ethylene bromide. Iodine may also be used to activate the magnesium. Activation may also be accomplished by abrading or breaking the surface of the magnesium.

The molar ratio of conjugated diolefin to magnesium may vary widely and is not critical. However, as previously mentioned, both valences of the magnesium are satisfied by hydrocarbyl radicals. Therefore, the ratio of diolefin to magnesium is preferably at least stoichiometric, i.e., two moles of diolefin per mole of magnesium, although any molar ratio that will form some Grignard reagent may also be used. Generally, however, the molar ratio will range from stoichiometric to about a 50% excess of diolefin.

In a particular embodiment of this invention, it has ben found that more than two moles of diolefin can combine with the magnesium. Thus, for example, when two moles of isoprene are reacted with magnesium, the compound $(C_5H_8)_2Mg$ will normally form. However, if the reaction is continued in the presence of isoprene, it is possible to incorporate anywhere from 1–6 more moles of isoprene to the compound and form such compounds as $(C_5H_8)_3Mg$, $(C_5H_8)_4Mg$, and, generally, compounds of the formula $(R')_nMg$, wherein $R'$ is one or more $C_4$–$C_{40}$ conjugated diolefins and $n$ is an integer from 2 to about 8. It is not presently known how these extra molecules add to the bond, but is generally believed to be via an insertion reaction either at a magnesium-carbon bond or at a carbon-carbon bond. Consequently, while a molar ratio of stoichiometric to about a 50% excess is normally utilized when preparing compounds of the formula $(R')_2Mg$, molar ratios ranging from about 2 moles diolefin to 1 mole magnesium to about 8 or more moles diolefin to 1 mole magnesium, depending, of course, on the particular compound to be prepared.

The reaction may be effected in the presence of a solvent or reaction medium such as high boiling, e.g., above 100° C. mononuclear aromatic hydrocarbons, e.g., benzene, toluene, xylene, mesitylene, diethyl benzenes, cumenes, etc., high boiling, e.g., above 60° C. ethers and polyethers, e.g., n-butyl ether, mixed alkyl aryl ethers, (e.g., anisole), diethyl carbitol, and high boiling saturated paraffinic hydrocarbons, e.g., isooctane, n-octane, kerosene, mineral spirits.

The preferred medium in which to carry out the present invention is one comprising a $C_4$–$C_{20}$, preferably a $C_4$–$C_{12}$, saturated cyclic ether such as tetrahydrofuran, tetrahydropyran and the lower alkyl or lower alkoxy derivatives thereof, e.g., methyl tetrahydrofuran, ethyl tetrahydropyran, ethoxy tetrahydrofuran, methoxytetrahydropyran and the like. Tetrahydrofuran is particularly preferred. Inert liquid such as the above-described hydrocarbons and alkyl ethers can be used in conjunction with these preferred cyclic ethers and, of course, will form a part of the reaction medium when dispersions of magnesium hydrocarbons and/or alkyl ethers are employed. When the cyclic ethers are used in conjunction with another solvent, it is preferred to have the cyclic ether present in an amount of from 0.25 to 2 or more moles per gram atom of magnesium.

The conjugated diolefins react with the magnesium to form the desired adducts at temperatures ranging from about 20° to about 150° C., preferably 65° to 150° C. It is generally preferred to add the magnesium and a few ml. of the reaction medium to the reactor vessel and, if desired, a small amount of a suitable activator such as ethylene bromide. A small amount of the diolefin in the reactor medium is then added and the mixture heated, if necessary, to initiate the reaction whereupon further amounts of diolefin in the reaction medium are added. The reaction mixture is finally heated at reflux temperature, e.g., about 65 to 150° C. for a period of hours, e.g., about 6 to 32 hours to complete the reaction. It is desirable to subject the reaction mixture to vigorous agitation. Since the magnesium-diolefin adducts are sensitive to moisture and oxidation, it is essential to carry out the process under anhydrous conditions and to blanket the reaction mixture with an inert gas such as nitrogen, helium, argon, and the like. When it is desired to form additional compounds wherein more than two moles of diolefin react with magnesium, time periods for the reaction will normally be greater than the range specified, e.g., up to 120 to 200 hours, or longer. Increasing addition of diolefin increases the time for complete reaction.

The magnesium-diolefin adducts may be isolated as such, e.g., flashing the solvent and/or diluent, or converting to other useful products. They may, for example, be hydrolyzed to yield terpene type hydrocarbons or oxidized and hydrolyzed to yield terpene alcohols, perfume and vitamin intermediates, acids, and polyols.

The adducts may also be subjected to carbonation by contacting the reaction mixture with solid carbon dioxide or with dry gaseous carbon dioxide to form dibasic carboxylic acids containing, on the average, two more carbon atoms than the magnesium-diolefin adduct. Such acids are useful in the preparation of plasticizers and other polyester products such as alkyd resins and polyamides, and as fungistats.

The adducts may be reacted with metal salts or organometallic salts to form new organotin compounds, new organosilicon and silicones, new organolead compounds, new phosphines, boranes, organozincs, organoantimony, mercurials, potentially novel titanium and zirconium sandwiches.

In addition to those reactions specifically mentioned, the magnesium-diolefin adducts may be reacted with any of the many other reactants normally associated with Grignard chemistry such as oxygen, alkylene oxides, aldehydes and ketones, sulfur, sulfur dioxide, sulfur trioxide, thionyl chloride, dialkyl sulfates, cyanogen chloride, haloamines, esters, anhydrides and the like. In this way, a variety of useful products can be prepared from the original conjugated diolefin.

In a particularly preferred embodiment of this invention, the Grignard reagents formed by the described process can be easily converted to unsaturated hydrocarbon compounds having a greater molecular weight than the feed diolefins, to alcohols that find great utility as odor chemicals, and to glycols which may be used as plasticizers or may be hydrogenated for use as synthetic fatty substances. While these conversions may be performed on any Grignard reagent, it is particularly preferred to form terpene based materials, e.g., terpenes, isoterpenes, isosesquiterpenes, isoditerpenes, etc. and still more preferred to convert $C_8$–$C_{15}$ Grignards (these being particularly useful for odor chemicals).

The hydrocarbons may be simply prepared by hydrolyzing the Grignard reagent with any of the well-known hydrolyzing agents, that is, any compound having an active hydrogen, i.e., a hydrogen that is easily replaced. Typical examples of hydrolyzing agents are: water, mineral acids, e.g., sulfuric, hydrochloric, organic acids, e.g., acetic, valeric, propionic, etc., phenols, amino compounds with active hydrogen, and the like. Dibasic acids, e.g., adipic, azelaic, formic, succinic, have two moles of active hydrogen per mole of acid. Hydrolysis can be effected at any temperature within which the Grignard is liquid; the molar ratio of hydrolyzing agent to Grignard should be at least stoichiometric, i.e., two moles active hydrogen to one mole Grignard; greater amounts are merely wasteful. Lesser amounts can be used but complete hydrolysis will not be obtained. These hydrocarbons are also used as odor chemicals, particularly the $C_{10}$ which has a pine oil odor which is desirable in household detergents and disinfectants.

The Grignard reagents prepared by this invention can also be converted to several different types of alcohols. One species of alcohol, believed to be a primary alcohol, can be prepared by oxidizing the more reactive of the magnesium-carbon bonds of the Grignard and hydrolyzing to remove the magnesium as a salt and free the alcohol. (It is well known to the art that Grignard reagents of the dialkyl type contain magnesium-carbon bonds of different reactivity. No reason is known for this phenomenon, but only that such is the case.) In preparing this alcohol species, the Grignard is first oxidized by an oxidizing agent in amounts of not more than 1.0 mole oxygen equivalent of oxidizing agent per mole of organomagnesium, preferably 0.1 to 1.0 molar equivalent mole and more preferably 0.25 to 1.0 molar equivalent mole. The oxidizing agent may be oxygen (considered to have 2 moles of oxidizing agent (O) per mole), as such, or as air, or as an oxygen+inert gas stream, e.g., with helium, nitrogen, argon, etc. Peroxides such as benzoyl peroxide, lauroyl peroxide, and dicumyl peroxide may also be used. Air is normally preferred because of its availability and relative low cost.

When oxidizing agents in amounts greater than 1.0 mole oxygen equivalent per mole of organomagnesium are utilized, the resulting product will be a mixture of monovalent alcohols and glycols. When glycols are desired any amount of oxidizing agent greater than 1.0 mole oxygen equivalent/mole of organomagnesium may be used, preferably 1.0 to 10, more preferably 1.0 to 2 moles/mole, e.g., 2 moles of oxygen equivalent, i.e., $O_2$, for best results. Regardless of the oxidation effected, the alcohol and/or glycols are generated by hydrolyzing the oxidized mixture with a suitable acid hydrolyzing agent. Basic hydrolyzing agents as well as water can be used but are generally undesirable since they tend to precipitate the magnesium, e.g., as magnesium hydroxide, and make the alcohols more difficult to recover. Suitable hydrolyzing agents are dilute acids such as sulfuric, acetic, citric, tartaric, hydrochloric, and generally any organic acid except odorific ones, e g., butyric acid, caproic acid, propionic acid. The acids should generally be quite dilute in order to eliminate the possibility of isomerization. The hydrolyzing agents is normally used in a stoichiometric amount, i.e., 2 moles/per mole of magnesium, or more, for complete reaction. Basic hydrolyzing agents may also be used but are not preferred due to the difficulty in handling the resulting product.

Both steps may be carried out at temperatures ranging from about $-70°$ C. to reflux, i.e., 70 to about $165°$ C., depending on the boiling point of the organosubstituent of the organomagnesium compound, preferably about $0°$ to $30°$ C. and more preferably $10°$ to $30°$ C., e.g., room temperature ($18°$ to $26°$ C.). Pressure normally has no bearing on the reactions and subatmospheric pressures, e.g., 0.1 atm., as well as superatmospheric pressures, e.g., 100 atm. may be employed. The reactions are generally carried out in the presence of a solvent such as those listed above for carrying out the Grignard formation reaction. However, when expensive solvents such as tetrahydrofuran are employed, diluents such as aromatics, e.g., benzene, toluene, xylene, paraffins, e.g., $C_5$–$C_{20}$ paraffins, and naphthenes may also be employed in amounts which provide a fluid reaction medium. The alcohols may be easily recovered by flashing the solvent and/or diluent and fractionating the product mixture under vacuum (excess heating will cause terpene type compounds to rearrange), e.g., 0.01 to 1.0 atm.

It is believed that another species of alcohols believed to be tertiary alcohols is formed by hydrolyzing the more active magnesium-carbon bond followed by oxidation, and hydrolysis to free the alcohol and remove the magnesium as a salt. The initial hydrolysis is normally conducted with not more than one mole active hydrogen per mole of organomagnesium compound since only one of the magnesium-carbon bonds is desired to be hydrolyzed. Typical hydrolyzing agents at this stage are water, lower alcohols, organic acids, e.g., acetic acid, benzoic acid, citric acid, and the like. Water is normally used here without difficulty since desirably only one magnesium bond will be hydrolyzed. Generally, about 0.1 to 1.0 mole hydrolyzing agent, preferably 0.5 to 1.0 mole hydrolyzing agent per mole of magnesium is employed. Hydrolysis is followed by oxidation (with oxidizing agents as previously mentioned) in amounts of about 0.1 to 50 or more moles of oxidizing agent per mole of magnesium and preferably at least about a 1:1 molar ratio based on magnesium. Larger amounts of oxidizing agent may be used but serve no purpose. The alcohols are generated by hydrolysis with hydrolyzing agents similar to those mentioned above for free freeing the alcohol when preparing the primary alcohol. Other reaction conditions, i.e., recovery of alcohol, temperatures, pressures, solvents and diluents, are similar to those employed in generating alcohols of the first-described species.

Alcohols prepared by either of the methods described above are quite useful as odor chemicals for the perfume industry. $C_{10}$ alcohols, prepared from diisoprene magnesium Grignards are particularly important because they are believed to be isomers of linalool (a tertiary $C_{10}H_{18}O$ alcohol) and geraniol (a primary $C_{10}H_{18}O$ alcohol), both naturally occurring substances that are widely used in perfumes. However, the alcohols prepared by the described procedures are difficult to analyze since they are comprised of large numbers of isomeric substances. For example, diisoprene-magnesium is believed to form in a head-to-tail configuration, i.e.,

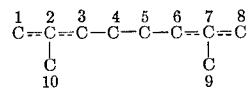

wherein carbon atoms 1, 2, 3 and 6, 7 and 8 have an allylic structure causing the bonding to the magnesium to be either from carbon atoms 3 and 6, 1 and 6, or 1 and 8, thereby giving rise to several different isomers. Further, with respect to diisoprene Grignards, capillary gas chromatography on the hydrolyzed hydrocarbons indicates about 20 different isomers. Consequently, alcohols prepared from such complex mixtures are difficult to analyze and identify.

Having now described the invention, the following examples will further serve to illustrate the process. However, no limitations, other than those in the claims appended hereto, are to be implied since modifications and variations of these examples will be obvious to those skilled in the art.

All of the reactions were carried out under an inert nitrogen atmosphere, except where otherwise specified, which was controlled under static conditions of a few centimeters of hydrocarbon pressure by use of an immersion bubbler. The diolefins were not freed of polymerization inhibitors prior to use and all starting materials were used without prior purification (including no insurance that they were free from moisture). Time of Flight measurements were made on a Bendix spectrometer coupled with a temperature programmed F&M 500 Gas chromatograph. Capillary gas chromatography was obtained in a 300 ft. R-column at $100°$ C., injection block $150°$ C., detector block $160°$ C. Preparative G.C. separation was performed in an Aeroprep unit using a 20 ft. x ⅜" 20% squalane column. Column temperature $100°$ C., injector block $200°$ C., detector block $200°$ C. NMR spectra were obtained at 60 mc. on a Varian A 60.

Example 1

This example shows that magnesium adds to the hydrocarbon without displacing hydrogen or the addition of hydrogen. The results presented below show that a resultant compound of magnesium and isoprene contained isoprene and magnesium in a ratio of 2 moles of isoprene per atom of magnesium. The product compound in the solution was reacted with an excess of 0.1 N hydrochloric acid, and the excess titrated with 0.1 N NaOH to show it to have two active carbon-magnesium bonds per molecule. When this compound was hydrolyzed with water, a hydrocarbon fraction was isolated in 70% yield. This hydrocarbon was found to have the following properties:

Infrared spectrum—Strong bonds at 894 cm.$^{-1}$

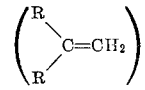

3080 cm.$^{-1}$ ($CH_2=$), 1650 cm.$^{-1}$ ($C=C$) and 1375cm.$^{-1}$ ($C$—$CH_3$)

Carbon-hydrogen analysis.—C, 86.80%; H, 13.51%. Calcd. for $C_{10}H_{18}$: C, 86.9%; H, 13.1%

Bromine No. 208 (Calcd. value for $C_{10}H_{18}$ diolefin, 230).

Boiling point range: 58–64° C. (18 mm.) Characteristic of monoterpene hydrocarbons. (Substantiates 2:1 ratio)
Odor—Pleasant odor free of chlorine Gas chromatography of this hydrocarbon fraction on a 20% carbowax column showed the presence of three main peaks at 15.6%, 39% and 45.4%. Time of flight mass spectrometry measurements show that each of these peaks has a molecular weight peak at 138 mass units which corresponds to a dihydrodiisoprene product. This data demonstrates that no hydrogen was replaced by isoprene in the reaction with magnesium since hydrolysis adds two hydrogen atoms at the magnesium bond.

Example 2

One gram atom of magnesium (24.3 g.) was charged to a flask equipped with a magnetic stirrer. The flask was swept with dry nitrogen and 2 ml. ethylene bromide and 6 ml. tetrahydrofuran were added whereupon the temperature in the flask rose to 49° C. Two moles of isoprene in 600 ml. tetrahydrofuran were added slowly to the flask over a period of about 3¼ hours. The temperature dropped to 43° C. a few minutes after addition was started and heating was started and after about 15 minutes the temperature was 51° C. and a green color began to appear. Upon completion of the addition of the isoprene and the solvent, temperature at reflux was 57° C. and the reaction mixture was a deep yellow-amber color. Heating at reflux was continued, the temperature gradually climbing to 65° C., at which temperature nearly all of the magnesium was observed to have dissolved and the color was a very dark black-green. This example demonstrates that the adduct contains at least 1 gram atom of Mg per 2 moles of isoprene. With larger amounts of isoprene as shown in the examples Grignards having a ratio of conjugated diolefin to magnesium varying from 2:8:1 can be prepared.

Example 3

The product of Example 2 was carbonated by dry gaseous carbon dioxide at a temperature of about 10° C. under inefficient magnetic stirring. Three products were obtained—a hydrocarbon, a monoacid (Acid No. Found 196, Theory 305), and a dibasic acid (Acid No. 440, Theory 496), NMR—indicated the presence of

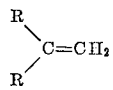

groups. The $I_2$ No. for the monoacid was 330. For the hydrocarbon it was 370. The hydrocarbon slowly polymerized on standing.

Example 4

The reaction of magnesium and isoprene was carried out as in Example 1 except that only one mole of isoprene in 400 ml. of tetrahydrofuran was added. When the reaction reached 68° C. a further 250 ml. of THF was added because the solution was viscous. Then 0.1 mole of isoprene in 10 ml. of THF was added and the reflux and stirring were continued until the temperature reached 67–68° C. The reaction mixture was diluted with tetrahydrofuran and decanted from the magnesium residue. After several washings and a final drying in air, the recovered unused magnesium weighed 10.1 grams. It was expected that if the isoprene reacted 1 to 1 with magnesium, all would be consumed. If, however, the reaction were 2 to 1, the 1.1 moles of isoprene would consume 0.55 gram atoms of magnesium leaving unused 10.6 grams. Thus, it appears from these results that 2:1 is the proper ratio.

Example 5

To 0.5 gram atom of 70–80 mesh magnesium powder activated by 2 ml. of ethyl bromide in 5 ml. of tetrahydrofuran was slowly added a solution of 0.5 mole isoprene in 400 ml. of tetrahydrofuran. After 20 minutes, addition was complete and the stirred mixture was heated to reflux, which commenced at 45° C. with the appearance of of a green coloration. Heating at reflux was continued for 25–26 hours longer. (Reaction mixture was shut down, cooled, but stirred at night and reheated in the morning.) During the time of reflux a further 42 grams (0.62 mole) of isoprene was added—a total of 1.12 moles in all. The mixture gave a very strong positive Color Test I of Gilman & Schultze, indicating beyond doubt an excellent yield of Grignard.

Example 6

To the isoprene Grignard from Example 5 was added slowly with stirring 0.5 mole (172 g.) of diphenyltin dichloride in 300 ml. of tetrahydrofuran. As the last few ml. of solution went in, the deep color of the Grignard solution gradually lightened, indicating that a quantity of Grignard equivalent to the organotin was present. The reaction was mildly exothermic. After filtration, the filtrate was water washed, the water being discarded. The organic solution on evaporation separated into a white solid and an oil, both possessing a pleasant terpene odor.

The white solid weighed 30.4 grams and analyzed 28.2% tin, $[\phi_2 Sn C_{10}H_{16})_n$ would contain 29.1% Sn]. It appeared to be a polymer, i.e., diphenyl tin diisoprene polymer. The colorless oil weighed 122.9 grams and analyzed 31.5% Sn and appeared to be monomeric, i.e., diphenyl tin diisoprene.

Dissolved in a heavty duty 30 weight lubricating oil at 1.0% level with a phosphosulfurized terpene added at the 0.5% level, the oily product showed good antiwear properties in a Falex lubricant tester. (Steel vs. steel, 200/400 lbs., for 30 minutes.)

Example 6A

Samples of the diphenyl tin diisoprene colorless oil, i.e., the monomer were tested as various agricultural pesticides as follows:

(1) House flies were controlled at a concentration of 0.1% in a contact test (2) Fungi (A) *Alternaria solani* were controlled at a concentration of 0.001%.

(B) *Monilia fructicola* were controlled at 0.0001% concentration.

(3) Nematodes (A) Panagrellus was controlled at a concentration of 0.001% with a phytotoxicity of very light burning (almost no injury).

It is noted that captan, the standard for fungus testing, is effective at 0.0001% against *Alternaria solani* and at 0.001% against *Monilia fructicola*.

Also, according to the present invention, preferred agricultural pesticides, e.g., insecticides, fungicides, miticides, and herbicides prepared generally as described in this example are dialkyl, diaryl, diaralkyl and dialkaryl tin adducts with 2 to 8 moles of any of the conjugated diolefins preferably described as feedstocks for preparation of the new magnesium Grignard of this invention. Preferred examples are dimethyl tin dibutadiene, dibutyl tin diisoprene, diphenyl tin diisoprene, diphenyl tin tetraisoprene, diphenyl tin hexaisoprene, diphenyl tin octaisoprene, dibutyl tin dimyrcene and phenyl butyl tin diphellandrene.

Example 7

To 1 gram atom of magnesium (24.3 grams), initiated by 2 ml. of ethyl bromide in 5 ml. of tetrahydrofuran was added (with stirring and heating) 2 moles (136 g.) of isoprene in 300 ml. of tetrahydrofuran. This was heated for 37⅓ hours, adding 100 ml. portions of tetrahydrofuran at the 29⅓ hour and the finish mark. All of the magnesium was in solution; regular magnesium Grignard turnings were used.

Example 8

Stannic chloride (1 mole, 117 ml., 260 g.) in pentane (to a volume of 500 ml.) was added slowly to the isoprene magnesium of Example 7. The addition was difficult because of the highly exothermic nature of the reaction and the tendency of the $SnCl_4$ to form a tetrahydrofuranate solid. This was compounded by poor stirring with the magnetic stirrer used. Heavy solids continually formed forming a crust on the surface of the mix. For this reason it took 6½ hours to add the mix. At the 5½ hour mark 500 ml. of pentane was added and 400 ml. more at the conclusion. The resulting mixture was heated by a water bath to 37–40° C. for 8 hours.

This was designed to yield isoprene tin dichloride, $((C_5H_8)_2) SnCl_2$.

Example 9

In a 5 liter four-neck flask, equipped with an anchor stirrer, thermometer, reflux condenser, dropping funnel, and a static nitrogen atmosphere, was placed 8 gram atoms (194.4 g.) of magnesium turnings. This was initiated by 5 ml. of ethylene dibromide and 5 ml. of tetrahydrofuran. Then a solution of 8 moles of isoprene in 1400 ml. of tetrahydrofuran was added with stirring and heating at reflux. Addition required the time from 8:40 a.m. to 4:26 p.m. at which time the reflux temperature was 53° C. The reaction was stopped overnight and restarted at 8:30 a.m. the following day. A further 8 moles of isoprene in 700 ml. of tetrahydrofuran was added over a period of 8 hours. Refluxing was continued for 48 hours, a liter of tetrahydrofuran added and reflux continued for 32 hours longer. After cooling it was sampled and the sample titrated to indicate 3.21 milliequivalent of Grignard per milliliter. The mixture was allowed to stand under nitrogen for a period from Apr. 30, 1964 to Aug. 12, 1964, to test its stability. It was still quite reactive. It was hydrolyzed by the following procedure: 600 ml. of methanol, then 1 liter of water followed by 16 moles of hydrochloric acid as concentrated (12 N) acid. Layers were separated, the organic layer concentrated in a rotary film evaporator to yield 1021 grams of terpenes boiling above 80° C. at 40 mm. Theory would be 1088 grams.

Example 10

To one gram atom (24.3 g.) of magnesium turnings activated by 2 ml. of ethyl bromide and 3 ml. of tetrahydrofuran was slowly added a solution of one mole (136 g.) of myrcene in 300 ml. of tetrahydrofuran with magnetic stirring and heating to reflux. After 3 hours of addition (all but about 100 ml. in) the temperature was 68° C. and color was developing. A further 8 hours heating (T=70° C.) yielded a dark green-black solution. After 8 hours' further heating a second mole of myrcene in 100 ml. of tetrahydrofuran was added and a further 24 hours heating led to complete consumption of the magnesium.

Example 11

To the myrcenyl magnesium of Example 10 was slowly added with cooling 2 moles (116 grams) of propylene oxide. The temperature rose rapidly despite the cooling, to about 60° C., thus this addition required 7¼ hours. The final mixture was solid. It was put into a 4 liter beaker, softened with 2.5 liters of benzene and treated with 190 ml. of concentrated HCl in 500 ml. of water solution. A further treatment with 500 ml. of water and one liter of benzene allowed separation of the viscous organic layer from the water layer. The organic layer was evaporated to yield a yellow oil semisolid with a hydroxyl number of 212.4 (theory 288).

Example 12

Magnesium (1.0 gram atom, 24.3 g.), activated by ethyl bromide and tetrahydrofuran was reacted with one mole of isoprene in 200 ml. of tetrahydrofuran by the process of Example 4 until the temperature of reflux reached 68–69° C. where it was held for 40 hours. Only about half of the magnesium was consumed (from visual inspection). A second mole of isoprene in 200 ml. tetrahydrofuran was added gradually and reaction continued until reflux was at 68–69° C. for about 12 hours. Most of the magnesium had been consumed. A third mole of isoprene was added—the reflux temperature fell to 54° C.—it required 17 hours at reflux before the temperature finally reached 61–62° C. Thus 3 moles had reacted.

Example 13

To one gram atom (24.3 grams) of magnesium turnings, initiated with 2 ml. of ethylene dibromide and 3 ml. of THF, was slowly added over a period of 13½ hours, 8 moles of isoprene in 800 ml. of tetrahydrofuran with anchor stirring and heating at reflux. At the finish of the addition the temperature of reflux was 49° C. Heating at reflux was continued for 80 hours to a final temperature of 56° C. One liter of toluene was added, the solution was cooled to 10–15° C. by an ice bath and dry carbon dioxide gas admitted. The temperature was controlled at 20° C. or lower by ice bath cooling and control of the rate of admission of the $CO_2$. The carbon dioxide addition required 1½ hours, after which the reaction was heated to 50° C. still in an atmosphere of $CO_2$. Carbon dioxide admission was continued overnight at room temperature. Water, 500 ml., was added. There was no rise in temperature indicating complete reaction. The tetrahydrofuran was distilled out and the residual solutions were acidified, the acids extracted into the organic layer. After separation the organic layer was extracted with 1 liter of water containing 80 grams of sodium hydroxide. The organic layer was evaporated to yield an orange liquid, 32.4 g., acid No. 9.94, mol. wt. 252. After acidification of the NaOH extract the acids were extracted from the water by use of ethyl ether. When the ether had evaporated a liquid portion and a solid portion resulted and were separated by filtration. The red-brown liquid weighed 82.6 grams and had an acid No. of 297. The solids weighed 81.1 grams, had a molecular weight of 668 and an acid No. of 215; Theory for

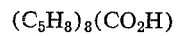

$(C_5H_8)_8(CO_2H)$ is M.W. 634 and acid No. 177. Since any nonacidic materials, i.e., any hydrocarbon polymer would have stayed in the organic layer as compared to the water layer where the only acid is obtained (from the metal carbon bond reacting with $CO_2$ to form the organic acid), this demonstrates that the original Grignard was an 8:1 isoprene magnesium adduct.

Example 14.—Dibutadiene magnesium

To one gram atom of magnesium, activated by 2 ml. of ethylene dibromide and 3 ml. THF was added slowly a solution of 100 g. (8 g. shy of 2 moles) of butadiene in 350 ml. of tetrahydrofurane. Reflux was controlled by a Scott Dry Ice condenser. Heat was applied and the temperature of reflux, 57° C. at the start, dropped during the 6 hours of addition to 30.5° C. It was allowed to stand overnight. In the morning, there were heavy deposits of mustard yellow solids and considerable Mg was consumed. Heating at reflux, 37° C. to start, was continued for 8 hours, 15 grams more butadiene in 100 ml. of THF was added (Temperature 44° C.). After 4 hours of heating the temperature went to 49° C. The yellow solids dissolved leaving a deep black solution. Eight hours of reflux took the temperature of reflux to 68° C. and no further rise occurred after a further 8 hours. All of the magnesium was dissolved.

Example 15.—Synthesis of terpene primary alcohols

One mole of isoprene magnesium $(C_{10}H_{16})$ Mg solution is placed in a flask equipped with a gas inlet tube and air (or oxygen) is bubbled into the mixture until the equivalent of one-half mole of oxygen has been admitted. The solution is then hydrolyzed with 100 ml. of water to remove the unreacted tertiary carbon to magnesium linkage. Sufficient dilute hydrochloric acid (about 2 moles) is added to solubilize the $Mg(OH)_2$ and the layers separated. After removal of the solvent, the residual alcohols are subjected to vacuum fractionation. In several repeats of this procedure, mixtures of terpene alcohols having very pleasant odors were obtained.

Example 16.—Synthesis of tertiary terpene alcohols

For this procedure, the isoprene Grignard is assayed by Gilman titration. Exactly one mole of the isoprene Grignard solution is placed in a flask like that of Example 15. Then, exactly one mole of water or of an acid hydrogen reagent, such as acetic acid is added very slowly with cooling and vigorous agitation. As soon as this reaction is complete (the partial hydrolysis to remove half of the carbon to Mg bonds, the more reactive one) air or oxygen is bubbled into the mixture, diluted if necessary with more tetrahydrofuran or other unreactive solvent. The mixture is then treated with water, hydrochloric acid solution; the layers separated, the organic layer stripped of solvent, and the organic residue fractionated under vacuum.

In this example those most reactive centers which react readily in Example 15 with oxygen are removed and the less reactive centers then react with oxygen to give alcohols isomeric with but different from those obtained in Example 15. Both series are terpene alcohols with delicate and delightful fragrances much prized for application in perfume essences. This product is quite similar to or contains linalool.

Example 17—2,3 dimethyl-1,3-butadienemagnesium 82.0 grams (1.0 mole) of 2,3 dimethyl-1,3-butadiene dissolved in 200 ml. of tetrahydrofuran was added dropwise to 0.5 g. atom (12–15 grams) of magnesium turnings, activated as usual. A green color developed immediately and became deeper as the addition proceeded. Heating to reflux and magnetic stirring was continued until the addition was complete after 5½ hours. Refluxing and stirring was continued during the intervals 8:15 a.m. to 4:30 p.m. with a slow stirring maintained during the night for a total of 84 hours of reflux time at which time the magnesium was consumed. A very strong Gilman Color Test I was obtained. This reagent is of questional structure; converted to the dibutyltin derivative, analyses indicated that only one dimethylbutadiene residue per tin had been obtained. The NMR spectrum was consistent with this, showing a mere trace of vinylic hydrogen at $\sigma=4.68$ (a virtual requisite if the dimer had formed) and the same quantity of $CH_2$ protons at the C=C—$CH_2$ position $\sigma=3.48$. In addition with the exception of the $CH_3$ protons on the butyls ($\sigma=0.90$) no unperturbed $CH_3$ protons were evident. Since the monomeric dimethylbutadiene radical attached to tin would contain primarily $SP^2$ bonding this is consistent with the NMR data. This may be an explanation of why no head-to-head dimerization was encountered with isoprene itself.

Example 18—1,4 diphenyl-1,3-butadienemagnesium

To 4.0 g. (0.121 g. atom+1.0 g. XS) of magnesium turnings (activated by 1 ml. ethyl bromide and 2 ml. of THF) was added slowly a suspension of 25 grams (0.121 mole) of 1,4 diphenyl-1,3-butadiene in 70 ml. of tetrahydrofuran over a period of ½ hour. Color went to a deep brown immediately. After heating 8 hours at reflux most of the magnesium appeared used, the suspended diphenylbutadiene had dissolved and the solution was black-brown in color. On cooling the solution gelled.

Example 19—α-phellandrenemagnesium

α-phellandrene (1.0 mole, 136 g.) in 250 ml. of tetrahydrofuran was added slowly to 1.0 g. atom of activated magnesium turnings over a period of 14½ hours at reflux, followed by 16 hours further heating. A strongly positive Gilman Color Test I was obtained, however, considerable unused magnesium remained. A second mole of α-phellandrene in 200 ml. of THF was added and reflux continued for 28½ hours, by which time the magnesium had disappeared.

Example 20—Isoprene piperylenemagnesium

Piperylene (2.0 moles, 136.0 g.) in 400 ml. of tetrahydrofuran was heated and stirred at reflux with activated magnesium (24.3 g.) for 48 hours without any reaction occurring (negative Gilman Color Test I). Then, 1.0 mole of isoprene (insufficient to react by itself with all of the Mg) was added, heated at reflux (58° C.) for 8 hours and allowed to stir overnight (by which time the magnesium was all consumed). A strongly positive Gilman Color Test I was obtained.

Example 21—Isoprene allo-ocimenemagnesium

Magnesium (24.3 g.) activated, was refluxed with 1.0 mole (136 g.) alloocimene in 250 ml. tetrahydrofuran for 24 hours with intermittent reinitiation of the magnesium, including addition of a vigorously reacting 1.0 g. of Mg with 1 ml. ethyl bromide and 2 ml. THF with no reaction ensuing. Then 1.0 mole of isoprene in 100 ml. of tetrahydrofuran was added and the magnesium activated by 1 ml. ethyl bromide. Heating for 37 hours resulted in complete solution of the magnesium.

Example 22—Isoprene butadiene-magnesium

To one gram atom magnesium (24.3 g.) activated as usual was added dropwise (accompanied by heating of the reactor) a mixture of 68 grams (1 mole) of isoprene and 54 grams (1 mole) of butadiene in 600 ml. tetrahydrofuran. Reflux was caught and returned to flask by use of a Dry Ice cooled Scott condenser. Heating, stirring and reflux was continued until temperature of reflux rose from low 40s to about 68° C. Yield of isoprene-butadiene magnesium was 92.6%, determined by adding 10 ml. of the solution to 40 ml. (0.5 N) HCl plus 50 ml. $H_2O$ and backtitrating excess acid with 6.5 ml. (0.1 N) NaOH.

Example 23—Isoprene myrcene-magnesium 24.3 grams magnesium flakes and 1 cc. ethylene bromide in 3 cc. tetrahydrofuran were added to a flask. One mole of myrcene and one mole of isoprene in 400 cc. tetrahydrofuran were added dropwise to the flask. The mixture was heated at reflux for about 7½ hours. Analysis of the product by titration similar to that in Example 22 showed a 85.9% yield of the isoprene myrcene-magnesium Grignard reagent.

What is claimed is:

1. An addition compound having the generic formula $(R')_n$ Mg wherein $R'$ is selected from the group consisting of $C_4$–$C_{40}$ conjugated diolefins and mixtures thereof, and $n$ is an integer from 2 to 8.

2. The compound of claim 1 wherein $R'$ is selected from the group consisting of $C_4$–$C_{10}$ conjugated diolefins and mixtures thereof.

3. The compound of claim 1 wherein $R'$ is isoprene.

4. Diisoprene-magnesium.

5. Dimyrcene-magnesium.

6. Dibutadiene magnesium.

7. Isoprene piperylene magnesium.

8. Isoprene myrcene-magnesium.

9. Isoprene butadiene-magnesium.

10. Isoprene allocimene-magnesium.

11. A process for preparing organomagnesium addition compounds which comprises adding magnesium to a diolefin selected from the group consisting of $C_4$–$C_{40}$ conjugated diolefins and mixtures thereof in the presence of saturated cyclic ether for a period of time sufficient to form an adduct of magnesium with the diolefins.

12. The process of claim 11 wherein the solvent is a $C_4$–$C_{20}$ saturated cyclic ether.

13. The process of claim 12 wherein the solvent is tetrahydrofuran.

14. The process of claim 11 wherein the reaction is conducted at temperatures ranging from about 20° C. to about 170° C.

15. The process of claim 11 wherein the reaction is promoted by activating the magnesium prior to reaction with the diolefin.

16. A process for preparing organomagnesium compounds which comprises reacting an activated magnesium with a diolefin selected from the group consisting of $C_4$–$C_{40}$ conjugated diolefins and mixtures thereof in the presence of $C_4$–$C_{20}$ saturated cyclic ether solvent at temperatures ranging from about 20°–170° C. for a period of time sufficient to form an adduct of magnesium with the diolefins.

17. The process of claim 16 wherein the diolefin is selected from the group consisting of $C_4$–$C_{10}$ conjugated diolefins and mixtures thereof.

18. The process of claim 17 wherein the solvent is tetrahydrofuran.

19. The process of claim 17 wherein the magnesium is activated by contact with a $C_1$–$C_{10}$ alkyl halide.

20. The composition of claim 1 wherein R' is selected from the group consisting of $C_4$–$C_{40}$ acyclic conjugated diolefins and mixtures thereof.

21. The composition of claim 1 wherein R' is selected from the group consisting of $C_4$–$C_{10}$ acyclic conjugated diolefins and mixtures thereof.

22. The process of claim 14 wherein said addition reaction is conducted under anhydrous conditions.

23. The process of claim 12 wherein said diolefin is selected from the group consisting of $C_4$–$C_{40}$ acyclic conjugated diolefins and mixtures thereof.

24. The process of claim 16 wherein said diolefin is selected from the group consisting of $C_4$–$C_{40}$ acyclic conjugated diolefins and mixtures thereof.

References Cited

Ivanoff et al.: Naturwissenschaften, 22 (1963), p. 688–9.

TOBIAS E. LEVOW, *Primary Examiner.*

A. P. DEMERS, *Assistant Examiner.*